United States Patent [19]

Curry et al.

[11] Patent Number: 4,683,169
[45] Date of Patent: * Jul. 28, 1987

[54] METHYL METHACRYLIC COATINGS ON THERMOPLASTIC FILM

[75] Inventors: Herbert L. Curry, Mount Vernon; Earl T. Crouch, Evansville, both of Ind.

[73] Assignee: General Electric Company, Pittsfield, Mass.

[*] Notice: The portion of the term of this patent subsequent to May 19, 2004 has been disclaimed.

[21] Appl. No.: 794,873

[22] Filed: Nov. 4, 1985

[51] Int. Cl.$^4$ .............................................. B32B 27/36
[52] U.S. Cl. ................................... 428/337; 428/412; 428/520; 428/522; 427/54.1

[58] Field of Search ............... 428/337, 412, 520, 522; 427/16

[56] References Cited

U.S. PATENT DOCUMENTS 3,582,398 6/1971 Ringler ........................... 427/160 X
4,396,678 8/1983 Olson ................................... 428/412
4,410,595 10/1983 Matsumoto et al. ................ 428/412

Primary Examiner—P. C. Ives
Attorney, Agent, or Firm—William F. Mufatti; Michael J. Doyle; Martin Barancik

[57] ABSTRACT

Methyl methacrylic UV protective coatings for polycarbonate film are disclosed with improved resistance to microcracking.

5 Claims, No Drawings

METHYL METHACRYLIC COATINGS ON THERMOPLASTIC FILM

This invention relates to UV light stable polycarbonate film and to a method for making the same. More particularly, this invention relates to polycarbonate film having a methyl methacrylic coating, thereon, to provide UV light stability.

BACKGROUND OF THE INVENTION

Transparent coatings of poly(methyl methacrylate) homopolymers and copolymers are known and applied to thermoplastic substrates, particularly, polycarbonate substrates, to impart UV light stability to the finished article. Such coatings may function as carriers for a UV stabilizing agent to protect the underlying substrate as well as function to provide a nondegradable surface. These coatings may be scratch-resistant, but longer coating life is generally obtained with the nonscratch-resistant type. Desirable or essential properties for these methyl methacrylic coatings include high gloss, retention of gloss after weathering, high heat distortion temperature, high elongation at break, UV stability, and resistance to microcracking. Particularly, microcracking with aging and exposure to weather has been a serious problem in such coatings.

Polycarbonate film is particularly sensitive to UV light. Upon exposure to UV light, polycarbonate film will not only undergo the discoloration and surface damage associated with polycarbonate sheet, but within short time periods, will experience sharp decreases in impact strength. Polycarbonate film, having a thickness of 5 mil, will generally fail in 6–12 months of exposure to direct sunlight. A thickness of greater than 60 mil is generally required for polycarbonate to retain impact strength for more than two years of exposure.

In addition to special UV sensitivity, the added flexibility of polycarbonate film accelerates deterioration of the surface coating. Particularly, Microcracking is accelerated as flexibility of the substrate increases. Microcracking of the surface coating leads to reduced transparency, coating failure in the form of flaking and peeling, and accelerated UV degradation of the substrate.

Thus, the UV stabilization of polycarbonate film is a difficult and recognized problem in the art. Film, as opposed to the sheet of U.S. patent application Ser. No. 696,671, filed Jan. 30, 1985, now U.S. Pat. No. 4,666,779, incorporated herein by reference, undergoes rapid physical property digradation upon weathering.

Therefore, it is an object of the present invention to provide polycarbonate film with a methyl methacrylic coating, which has improved resistance to microcracking, yet maintains desirable heat distortion properties, transparency, high gloss, good retention of gloss after weathering, desirable elongation at break, and excellent UV stability.

DETAILED DESCRIPTION OF THE INVENTION

Briefly, according to the present invention, certain copolymers of methyl methacrylate and ethyl methacrylate, n-butyl methacrylate, or i-butyl methacrylate are found to have surprising resistance to microcracking upon aging and weathering, as well as other desirable properties when applied as a protective coating composition to polycarbonate film. These coatings are characterized by high ratios of methyl ester to ethyl, n-butyl, or i-butyl esters, moderate values of elongation at break and glass transition temperature of 87° C. and above.

Suitable polycarbonate for extrusion into film may be prepared by reacting a dihydric phenol with a carbonate precursor, such as phosgene, haloformate or a carbonate ester. Typically, they will have recurring structural units of the formula:

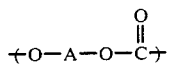

wherein A is a divalent aromatic radical of the dihydric phenol employed in the polymer producing reaction. Preferably, the aromatic carbonate polymers have an intrinsic viscosity ranging from 0.30 to 1.0 dl./g. (measured in methylene chloride at 25° C.) By dihydric phenols is meant mononuclear or polynuclear aromatic compounds containing two hydroxy radicals, each of which is attached to a carbon atom of an aromatic nucleus. Typical dihydric phenols include 2,2-bis-(4-hydroxyphenyl)propane; 2,2-bis-(3,5-dimethyl-4-hydroxyphenyl)propane, 4,4'-dihydroxy-diphenyl ether, bis(2-hydroxyphenyl)methane, mixtures thereof and the like. The preferred aromatic carbonate polymer for use herein is a homopolymer derived from 2,2-bis(4-hydroxyphenyl)propane, i.e., bisphenol-A. Polycarbonates suitable for use herein, including methods of polymerization and a further disclosure of monomer constituents, are described in U.S. Pat. Nos. 2,999,835; 3,028,365; 3,334,154; 4,131,575; 4,018,750; and 4,123,436 which are incorporated herein by reference.

Included within the polycarbonate resins herein are the poly(ester-carbonates). In addition to the dihydric phenol and carbonate precursor as described above, poly(ester-carbonate) is polymerized from an aromatic dicarboxylic acid, such as, for example, iso-or terephthalic acid. The preparation of the poly(ester-carbonates), which may be employed as the substrate of the present invention, is described in U.S. Pat. Nos. 3,030,331; 3,169,121; 3,207,814; 4,194,038; and 4,156,069 which are incorporated herein by reference.

The polycarbonate may be extruded into film by means known to the art. As stated above, it is polycarbonate film having thicknesses less than about 60 mils that is subject to short term loss of impact strength, thus the present invention is primarily concerned with polycarbonate film having thicknesses between about 1 and 60 mils, and especially such film having thicknesses between about 5 and 30 mils. The film may be textured on one surface to reduce glare as taught in a copending U.S. patent application of the present assignee, Ser. No. 696,672, filed Jan. 30, 1985, now U.S. Pat. No. 4,661,394.

The protective coating of the present invention is a methyl methacrylic thermoplastic random copolymer with methacrylic modifying units of ethyl methacrylate, n-butyl methacrylate, i-butyl methacrylate, or mixtures thereof, and optionally, modifying units of other alpha-beta ethylenically unsaturated compounds. The modifying units must be combined with the methyl methacrylic units in the random copolymer in such ratio as to result in a thermoplastic material having a tensile elongation at break (23° C., 50 percent RH) of greater than about 3.5 percent, and a glass transition temperature of greater than about 87° C.

Persons skilled in the art of methacrylic polymer chemistry may determine the proper makeup and molecular weight of the random methyl methacrylic copolymer to achieve the required physical properties. However, to retain the methyl methacrylic character of the finished protective coat, no more than about ½ percent to about 10 percent by number of the mers of the copolymer chain may be derived from methacrylic modifying units of ethyl methacrylate, n-butyl methacrylate, i-butyl methacrylate, or mixtures thereof, and optionally, no more than 5 percent by number of the mers of the copolymer chain may be from modifying units of other alpha-beta ethylenically unsaturated modifying units so long as they do not radically alter the properties of the copolymer. Suitable alpha-beta ethylenically unsaturated modifying units may be derived from, for example, acrylic acid, methacrylic acid, alkyl esters of acrylic and methacrylic acids (the alkyl group having 1 to 4 carbon atoms), acrylonitrile, methacrylonitrile, styrene and its derivatives, ethene, propene, etc. Preferably, the methacrylic modifying unit is derived from ethyl methacrylate and the other ethylenically unsaturated modifying unit is derived from ethylene.

Suitable protective coatings of the present invention may be derived from commercial methyl methacrylic materials or blends of commercial methyl methacrylic materials presently on the market. Such commercial methyl methacrylic materials usually require the addition of carrier liquid according to the method chosen for application to the substrate and drying. A particular commercial methyl methacrylic material suitable for use herein is sold as ELVACITE TM bead polymer Grade 2021 by DuPont E.I. de Nemours and Company. This "ELVACITE 2021" has a specific gravity 25°/25° C., of 1.2, a glass transition temperature of 100° C., tensile strength (23° C., 50 percent RH) of 15,000 psi (106 MPa), and elongation at break (23° C., 50 percent RH) of 4%.

For blending and application, the above acrylics can either be emulsified or dissolved in a liquid carrier system. Suitable liquid carrier system for use with emulsion borne acrylics contain relatively high weight ratios of water to organic solvent. Too low a such ratio will lead to breakdown of the emulsion with a concomitant coagulation of the the acrylic. Conversely, liquid carrier systems for use with solvent borne acrylics contain relatively low weight ratios of water to organic solvent. At this opposite extreme, too high a such ratio will lead to precipitation with a concomitant coagulation of the acrylic. In the latter case, water may be completely eliminated from the liquid carrier system. Persons skilled in the art of such liquid carrier systems may readily determine proper and desirable ratios of water to organic solvent to obtain suitable acrylic emulsions or solutions. It is preferred that the liquid carrier system be entirely organic solvent.

Where an organic solvent is employed, it is best to adapt the solvent system according to the method of application to optimally balance the evaporation rate of the solvent in a drying step against the aggressiveness of the solvent on the polycarbonate film. Although persons skilled in the art can readily imagine organic solvents suitable for use herein, suggested solvents are hydroxy ethers, aliphatic alcohols, and ketones.

Suitable hydroxy ethers may be represented by the general formula:

$$R^1-O-R^2-OH$$

wherein $R^1$ is an alkyl radical or hydroxy substituted alkyl radical and $R^2$ is an alkylidene radical and preferably, the sum of the carbon atoms present in $R^1$ and $R^2$ is from 3 to about 10. Specifically, suitable hydroxy ethers are ethylene glycol monoethyl ether, propylene glycol monoethyl ether, ethylene glycol monobutyl ether, etc. Suitable aliphatic alcohols contain from 1 to 4 carbon atoms and include methanol, ethanol, isopropanol, t-butanol, isobutyl alcohol and the like. Suitable ketones may be represented by the general formula:

$$R^3-\overset{\overset{\displaystyle O}{\|}}{C}-R^4$$

wherein $R^3$ and $R^4$ are alkyl radicals or hydroxy substituted alkyl radicals the preferred sum of the carbon atoms of which varies from about 2 to about 10. Specifically, suitable ketones are, for example, methyl ethyl ketone, acetone, 4-hydroxy-2-keto-4-methylpentane (diacetone alcohol), etc. Of course, these organic solvents may be blended with each other or with other organic solvents to arrive at a proper solvent system.

Solvent system is added to the methyl methacrylic polymer for the purpose of applying the protective coat to the substrate in an amount sufficient to dissolve the polymer but not in such an amount that an undue burden is placed on the drying equipment to dry and produce the protective coat. The optimum ratio of solvent to methacrylic polymer changes according to the method of application used, the constituents of the solvent system, and the desired viscosity. Generally, the weight ratio of solvent system to methacrylic polymer will vary from about 99/1 to about 1/4.

Ultraviolet light absorbing compounds must be present in an amount effective to protect the polycarbonate substrate from the degradative effects of ultraviolet light. Ultraviolet light absorbing compounds preferred for use in the present invention, are those with a high affinity for polycarbonate as opposed to the methyl methacrylic protective coating. Thus, UV light absorbing compounds impregnated into the substrate before the protective coating step should have low tendency to migrate into adjoining layers or bloom, and UV light absorbing agents applied through surface impregnation simultaneous to the application of the protective coating should have a high tendency to migrate into the substrate and out of the protective coating layer. UV light absorbing compounds which are copolymerized into the methyl methacrylic coating are also suitable. Some non-limiting examples of UV light absorbing compounds suitable for use herein, especially for surface impregnation of polycarbonate substrates, are benzephenone derivatives such as 2,2'-dihydroxybenzophenone, 2,2'-dihydroxy-4,4'-dimethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone; and the like; and diphenylcyanoacrylates such as ethyl-2-cyano-3,3-diphenylacrylate, 2-ethylhexyl-2-cyano-3,3-diphenylacrylate, lower aliphatic substituted diphenyls thereof, lower aliphatic substituted esters thereof, and the like.

The UV light absorber, for application by surface impregnation, is added to the methyl methacrylic polymer/solvent system composition in amounts effective to protect the substrate. However, the amount of UV light absorbing compound added becomes excessive when the drying conditions of the protective coating are not effective to complete migration of the UV light absorbing compound out of the protective coating or the substrate is unable to absorb the entire amount of UV light absorbing compound.

The methyl methacrylic polymer/carrier liquid system compositions of the instant invention may also optionally contain various flatting agents, surface-active agents, stabilizers such as antioxidants, and thixotropic agents. All of these additives and the use thereof are well known in the art and do not require extensive discussion. Any compound possessing the ability to function in such a manner, i.e., as a flatting agent, surface-active agent, and stabilizer, can be used provided they do not adversely effect the required physical properties of the protective coating or adhesion.

The methyl methacrylic polymer/carrier liquid system composition may be applied to the polycarbonate substrate by any of the well known methods such as spraying, dipping, roll-coating, flow coating, and the like. Usually, the composition is applied in an amount sufficient to provide a dried protective coating having a thickness of from about 0.01 to about 1.0 mil. As stated above, preferred and optimum solvent systems may change according to the method of application chosen with, for example, less viscous solvent systems being used for spray coating and solvent systems of higher viscosity being used for dip coating.

The carrier liquid system is evaporated with air drying and heating to leave an even and uniform protective layer of methyl methacrylic polymer. Generally, it is desirable that the drying time of the protective coating be as short as possible and thus the temperature of the drying step should be as great as practical. However, the temperature should not approach the heat distortion temperature of the substrate, the flash temperature of any organic vapor, or the boiling point of the carrier liquid system. In the case where a UV light absorber is to be applied to the substrate by surface impregnation, the drying temperature and time must be sufficient to induce and complete migration of the UV light absorbing compound from the protective methacrylic coating into the substrate. Commonly, drying times vary from about 10 minutes to 30 minutes and drying temperatures range from about 120° C. to about 130° C.

Thus has been described a protective coating for polycarbonate film having resistance to microcracking upon aging, weatherability, high gloss, good hardness, and improved cold bending. These protective coatings are copolymers of methyl methacrylate with ethyl methacrylate, n-butyl methacrylate, and/or i-butyl methacrylate and optionally, small amounts of other alpha-beta ethylenically unsaturated compounds which have been formulated and copolymerized to produce a protective methyl methacrylic coating having a glass transition temperature of greater than about 87° C. and an elongation at break (23° C., 50 percent RH) of greater than about 3.5%.

DESCRIPTION OF THE PREFERRED EMBODIMENTS

In order that those skilled in the art will be better able to practice the invention, the following examples are given by way of illustration and not be way of limitation. All parts, except as otherwise indicated, are by weight.

EXAMPLE 1

Coating compositions having the following formulations were prepared by mixing the ingredients thoroughly

| | |
|---|---|
| PMMA[1] | 6.5 |
| Solvent | 90 |
| UV Absorber | 3.5 |

[1]ELVACITE 2021 resin, methyl methacrylate copolymer, DuPont Company: Elongation at Break (23° C., 50% RH) 4% and glass transition temperature 100° C.

EXAMPLE 2

A 10 mil LEXAN 8010-112[2] polycarbonate film was roll coated with the composition of Example 1 and dried to a coating thickness of about 0.3 mil in an oven at 125° C. for 3–5 minutes. The resulting composite was clear and tack free with no substantial amounts of UV absorber in the methyl methacrylic protective coat.

[2]non-UV stabilized, extruded from LEXAN 101 resin, (i.v. at 25° C. in trichloromethane is 0.53–0.58dl/g), General Electric Company, Mt. Vernon, Id.

EXAMPLE 3

The coated film of Example 2 was exposed in an accelerated UV exposure chamber manufactured by Atlas Electric Devices, Chicago, Ill., using 40 watt florescent UV lamps at an operating cycle of 8 hours ON/60° C./75% RH and 4 hours OFF/50° C./100% RH. Also placed into the accelerated UV exposure chamber was uncoated LEXAN 8010-112 10 mil polycarbonate film and an impregation UV stabilized LEXAN 8040-112[3] 10 mil polycarbonate film. Discoloration as measured by yellowness index[4], and physical strength, as measured by elongation to break, were compiled as a function of exposure time. The results are shown below.

| | Physical Strength | | |
|---|---|---|---|
| | | Elongation to Break, % | |
| Exposure Time, Hours | Polycarbonate Film | UV Stabilized Polycarbonate Film | Coated Polycarbonate Film (Ex. 1) |
| 0 | 151 | 121 | 149 |
| 75 | 115 | 131 | 162 |
| 150 | 51 | 51 | 149 |
| 300 | 14 | 22 | 125 |
| 450 | 8 | 11 | 112 |
| 600 | — | — | 143 |

[3]extruded from LEXAN 104 resin containing 0.2 by weight UV stabilizer, (i.v. at 25° C. in trichloromethane is 0.53–0.58 dl/g), General Electric Company, Mt. Vernon, IN.
[4]measured in accordance with ASTM-D1925 on a Gardner -XL-235 hazemeter.

| | Discoloration | | |
|---|---|---|---|
| | | Yellowness index | |
| Exposure Time, Hours | Polycarbonate Film | UV Stabilized Polycarbonate Film | Coated Polycarbonate Film (Ex. 1) |
| 0 | 0.9 | 1.4 | 1.5 |
| 75 | 6.1 | 3.3 | 1.0 |
| 150 | 8.2 | 6.5 | 1.0 |
| 300 | 11.3 | 8.8 | 0.6 |
| 450 | 12.6 | 9.2 | 1.0 |
| 600 | — | — | 1.1 |

What is claimed is:

1. A UV stable article comprising a film substrate of polycarbonate having a thickness of from about 1 to about 60 mils, and a microcrack resistant protective external coat comprising a copolymer consisting essentially of:
   (a) methyl methacrylate units,
   (b) from about ½ percent up to about 10 percent by number of other methacrylate units selected from the group consisting of ethyl methacrylate, n-butyl methacrylate, i-butyl methacrylate, or mixtures thereof, and
   (c) from 0 percent up to 5 percent by number of other alpha-beta ethylenically unsaturated units; wherein said units are combined in such ratio to result in a copolymer material having a tensile elongation at break of greater than about 3.5 percent and a glass transition temperature greater than about 87° C.

2. The article of claim 1 wherein said film substrate has a thickness of from about 5 to about 30 mils.

3. The article of claim 1 wherein said other methacrylate units are ethyl methacrylate units.

4. The article of claim 1 wherein said other unsaturated units are polyethylene units.

5. A UV stable article comprising a film substrate of polycarbonate having a thickness of from about 1 to about 60 mils and a microcrack resistant protective external coat comprising a copolymer consisting essentially of:
   (a) methyl methacrylate units,
   (b) from about ½ percent up to about 10 percent by number ethyl methacrylate units, and
   (c) from 0 percent up to 5 percent by number of other alpha-beta ethylenically unsaturated units; wherein said units are combined in such ratio to result in a copolymer material having a tensile elongation at break (23° C., 50 percent RH) of greater than 3.5 percent and a glass transition temperature greater than about 87° C.

* * * * *